UNITED STATES PATENT OFFICE.

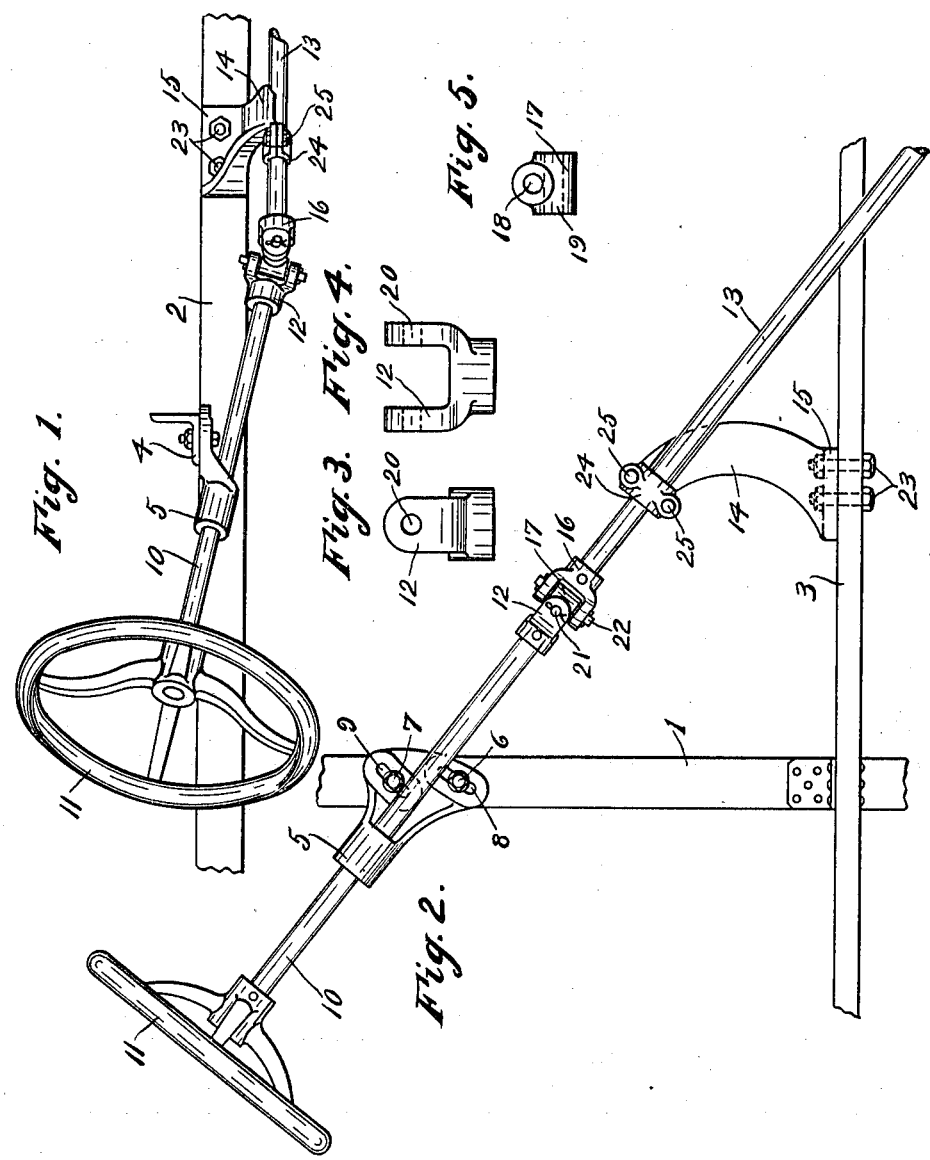

GEORGE W. SEAMAN, OF MANSFIELD, OHIO, ASSIGNOR TO THE AULTMAN & TAYLOR MACHINERY COMPANY, OF MANSFIELD, OHIO, A CORPORATION OF OHIO.

STEERING-GEAR.

1,048,748.   Specification of Letters Patent.   Patented Dec. 31, 1912.

Application filed May 5, 1911. Serial No. 625,329.

*To all whom it may concern:*

Be it known that I, GEORGE W. SEAMAN, a citizen of the United States of America, residing at Mansfield, in the county of Richland and State of Ohio, have invented certain new and useful Improvements in Steering-Gears, of which the following is a specification.

My invention relates to steering gears for traction engines or the like.

The objects of my invention are to provide means of raising or lowering the steering wheel to accommodate different heights of operators; to provide means of mounting and operating a steering gear and column at an incline with the body of the machine, either laterally or vertically; to provide a novel knuckle joint capable of connecting the parts of the column together and to provide means for holding the steering wheel and column in position after adjustment. I attain these and other objects by the mechanism illustrated in the accompanying drawing in which:—

Figure 1 is a plan view of my steering gear. Fig. 2 is a side elevation of Fig. 1. Fig. 3 is a view of one side of a bifurcated jaw. Fig. 4 shows a view of another side of Fig. 3. Fig. 5 shows a plan view of a link block.

In the drawings, reference numerals 1, 2, 3 and 4 represent parts of the frame of a machine showing preferred method of mounting the operating mechanism of the steering gear. A slotted bracket 5 is adjustably secured at an incline to the part 1 of the frame and is provided with cap screws 6 and 7 which pass through the slots 8 and 9 and are adapted to hold the bracket 5 at any point of its adjustment. The slotted bracket 5 is provided with a central aperture into which a steering column 10 is fitted carrying a steering wheel 11 which is adapted to rotate the steering column 10.

A bifurcated member 12 is rigidly secured to the extremity of the steering column 10. If desired, the end of the column 10 may be formed bifurcated. The lower part of the steering column 13 which is shown broken away at one end is journaled in the arm 14 of the bracket 15. When in operation, the lower part of the steering wheel carries a worm gear which meshes another gear for turning the front axle of the machine. (These parts are not shown in the drawing.)

A bifurcated member 16 similar to the member 12 is rigidly attached to the extremity of the part 13 of the steering column. A link block 17 is provided with apertures 18 and 19 which are formed in the block at right angles to each other. The bifurcated members are provided with apertures 20, 20. Pivot pins 21 and 22 pass through the apertures 20, and join together the upper and lower parts 10 and 13 of the steering column. The bracket 15 is fastened to the part 3 of the frame by through-going bolts 23. A cap 24 is provided adjacent to the extremity of the arm 15 for taking up wear of the parts and is held in place by the bolts 25.

In the operation of my steering device, when the bolts 6 and 7 are loosened, the bracket 5 can be raised or lowered in a vertical inclined plane to suit the height of the operator and held in the adjusted position by tightening the bolts. The part 10 of the steering column swings pivotally upon the pin 21 and when it is desired to move the part 10 of the steering column and wheel 11 in a lateral direction as shown in Fig. 1, it pivots upon the pin 21 and is held in place by the bracket 5 which can be arranged to correspond with lateral adjustment of the part 10 of the steering column.

It will be observed that this feature is of great convenience as it permits the steering wheel and column to be carried and operated away from the other working parts of the machine.

What I claim is:—

In a steering gear, the combination of a two-part column and a wheel, means to connect said parts together at an incline for universal movement, of a slotted bracket to journal the upper part of the column and provide for inclined vertical adjustment, a bracket to journal the lower part of the column and arranged to support said lower part and connect with the upper part at a lateral incline, substantially as and for the purpose described.

In testimony whereof I affix my signature in presence of two witnesses.

GEORGE W. SEAMAN.

Witnesses:
    WM. I. BISHOP,
    JOHN H. BOSS.

Copies of this patent may be obtained for five cents each, by addressing the "Commissioner of Patents. Washington, D. C."